(12) United States Patent
Mandagere et al.

(10) Patent No.: US 10,977,081 B2
(45) Date of Patent: Apr. 13, 2021

(54) CONTEXT AWARE CONTAINER MANAGEMENT

(71) Applicant: International Business Machines Corporation, Armonk, NY (US)

(72) Inventors: Nagapramod Mandagere, Mountain View, CA (US); Dean Hildebrand, Bellingham, WA (US); Mohamed Mohamed, San Jose, CA (US); Robert Engel, San Francisco, CA (US); Amit Suresh Warke, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/280,115

(22) Filed: Feb. 20, 2019

(65) Prior Publication Data
US 2020/0264930 A1    Aug. 20, 2020

(51) Int. Cl.
*G06F 9/50* (2006.01)
*G06F 3/06* (2006.01)

(52) U.S. Cl.
CPC .......... *G06F 9/5016* (2013.01); *G06F 3/0604* (2013.01); *G06F 3/0665* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,255,915 B1 * | 8/2012 | Blanding | .............. | G06F 9/5027 718/104 |
| 10,564,870 B1 * | 2/2020 | Greenwood | .......... | G06F 3/0649 |
| 10,601,908 B1 * | 3/2020 | Ragupathy | .......... | H04L 43/0876 |
| 2005/0228852 A1 * | 10/2005 | Santos | .................. | G06F 9/5005 709/200 |
| 2006/0075007 A1 * | 4/2006 | Anderson | ............. | G06F 3/0652 |
| 2007/0028069 A1 * | 2/2007 | Sarkar | ................... | G06F 3/0637 711/170 |
| 2010/0082549 A1 * | 4/2010 | Hollingsworth | ...... | G06F 16/252 707/665 |

(Continued)

OTHER PUBLICATIONS

Piraghaj, Sareh F., et al., Virtual Machine Customization and Task Mapping Architecture for Efficient Allocation of Data Center Resources, The British Computer Society 2015, Comput J (2016), 59(2): 208-224, Published Nov. 30, 2015.

*Primary Examiner* — Isaac T Tecklu
(74) *Attorney, Agent, or Firm* — Lieberman & Brandsdorfer, LLC

(57) ABSTRACT

Embodiments relate to a computer system, computer program product, and method to support context aware container volume management. Two or more containers are operatively coupled to a shared operating system instance. Workflow and system topologies directed at the containers are modeled. The workflow models transition states of containers. The container topology model identifies relationships between two more containers. The storage topology model identifies a relationship and dependency of storage volumes. The models are leveraged to assess and autonomously determine functional container storage requirements. Assignment(s) of an application container to a volume is optimized and selectively attached responsive to the autonomous determination.

18 Claims, 11 Drawing Sheets

(56) References Cited

U.S. PATENT DOCUMENTS

| | | | | |
|---|---|---|---|---|
| 2011/0252166 A1* | 10/2011 | Padala | ............ | G06F 3/061 |
| | | | | 710/74 |
| 2012/0284239 A1* | 11/2012 | Agarwala | ............ | G06F 3/067 |
| | | | | 707/693 |
| 2015/0331617 A1* | 11/2015 | Slik | ............ | G06F 12/0802 |
| | | | | 711/169 |
| 2016/0292200 A1* | 10/2016 | Gabay | ............ | G06F 3/0653 |
| 2016/0323374 A1* | 11/2016 | Russinovich | ............ | G06F 3/0631 |
| 2017/0063722 A1* | 3/2017 | Cropper | ............ | H04L 47/823 |
| 2017/0083380 A1* | 3/2017 | Bishop | ............ | G06F 9/5083 |
| 2017/0277715 A1* | 9/2017 | Strauss | ............ | G06F 16/1865 |
| 2018/0165033 A1* | 6/2018 | Baig | ............ | G06F 3/061 |
| 2019/0138367 A1* | 5/2019 | Bishop | ............ | G06F 9/5083 |
| 2019/0220315 A1* | 7/2019 | Vallala | ............ | G06F 9/5077 |
| 2019/0286486 A1* | 9/2019 | Ma | ............ | G06F 9/5027 |
| 2019/0354411 A1* | 11/2019 | Raikov | ............ | G06F 9/4843 |
| 2019/0361618 A1* | 11/2019 | Avraham | ............ | G06F 3/0665 |
| 2020/0004451 A1* | 1/2020 | Prohofsky | ............ | G06F 3/0659 |
| 2020/0012443 A1* | 1/2020 | Chen | ............ | G06F 3/0665 |
| 2020/0012510 A1* | 1/2020 | Andrianov | ............ | G06F 9/45558 |
| 2020/0019311 A1* | 1/2020 | Zolotow | ............ | G06F 3/0604 |
| 2020/0042392 A1* | 2/2020 | Alluboyina | ............ | G06F 16/128 |
| 2020/0042618 A1* | 2/2020 | Mukku | ............ | G06F 16/122 |

* cited by examiner

US 10,977,081 B2

CONTEXT AWARE CONTAINER MANAGEMENT

BACKGROUND

The present embodiments relate to volume management for a containerized eco-system. More specifically, the embodiments relate to context aware management of the containerized eco-system.

A virtual machine (VM) is a software-based environment to simulate a hardware-based environment. Like a physical computer, the VM runs an operating system and applications. The VM exhibits behavior of a separate computer, but is also capable of performing tasks, such as running applications and programs like a separate computer. The VM, which is commonly referred to as a guest, is created within another computing environment commonly referred to as a host. It is understood that multiple VMs can exist within a single host.

Conventional applications are designed to be managed by an operating system (O/S) and executed by a set of processor cores. With VMs, a software component called a hypervisor acts as an agent between the VM environment and the underlying hardware, providing the necessary layer of abstractions. The hypervisor allows multipole VMs to run on a single machine.

Containers are an abstraction at the application layer. Container technology offers an alternative method for virtualization, in which a single operating system can host two or more different applications. Containers and VMs have similar resource isolation and allocation benefits, but function differently because containers virtualize the operating system instead of the hardware.

SUMMARY

The embodiments described herein comprise a system, computer program product, and method for context aware container volume management.

In one aspect a computer system is provided with a processing unit operatively coupled to memory, and shared operating system operatively coupled to the processing unit. Two or more application containers are managed by the shared operating system, and a manager is provided to manage select assignment of application containers to the storage volumes. The manager leverages data from one or more models to autonomously determine container requirements. The models include one or more of a workflow model, an application container topology model, and a storage model. The workflow model tracks transition state of application containers, the application container topology model identifies a relationship between containers, and container dependencies, and the storage topology model identifies a relationship and dependencies of storage volumes. In addition, an optimizer is provided to optimize assignment of one or more application containers to one or more storage volumes, including selective attachment.

In another aspect, a computer program product is provided for context ware container volume management. The computer program product comprises a computer readable storage device having program code embodied therewith, the program code executable by a processing unit. More specifically, program code models workflow, application container topology, and storage topology. The workflow model tracks transition state of application containers, the application container topology model identifies a relationship between containers, and container dependencies, and the storage topology model identifies a relationship and dependencies of storage volumes. Program code is provided to leverage data from the models to autonomously determine container requirements, and to optimize assignment of one or more application containers to one or more storage volumes, including selective attachment.

In yet another aspect, a method is provided for context ware container volume management. Modeling takes place in the form of workflow, application container topology, and storage topology. The workflow model tracks transition state of application containers, the application container topology model identifies a relationship between containers, and container dependencies, and the storage topology model identifies a relationship and dependencies of storage volumes. Data from the models is leveraged to autonomously determine container requirements, and to optimize assignment of one or more application containers to one or more storage volumes, including selective attachment.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Current trends in application deployment are directs at container virtualization and application decomposition into smaller modular micro-services. Instead of deploying applications as monolithic blocks in a VM, the applications are broken down into smaller parts and individually deployed as containers. These micro-services each have storage needs, with different micro-services having different storage requirements and burdens. Similarly, the lifespan of different containers may vary, thereby placing a burden on an associated storage system. Accordingly, the embodiments shown and described herein after directed at scalability of a storage system to match and attend to emerging workload requirements associated with containers and container virtualization.

Figure 1:
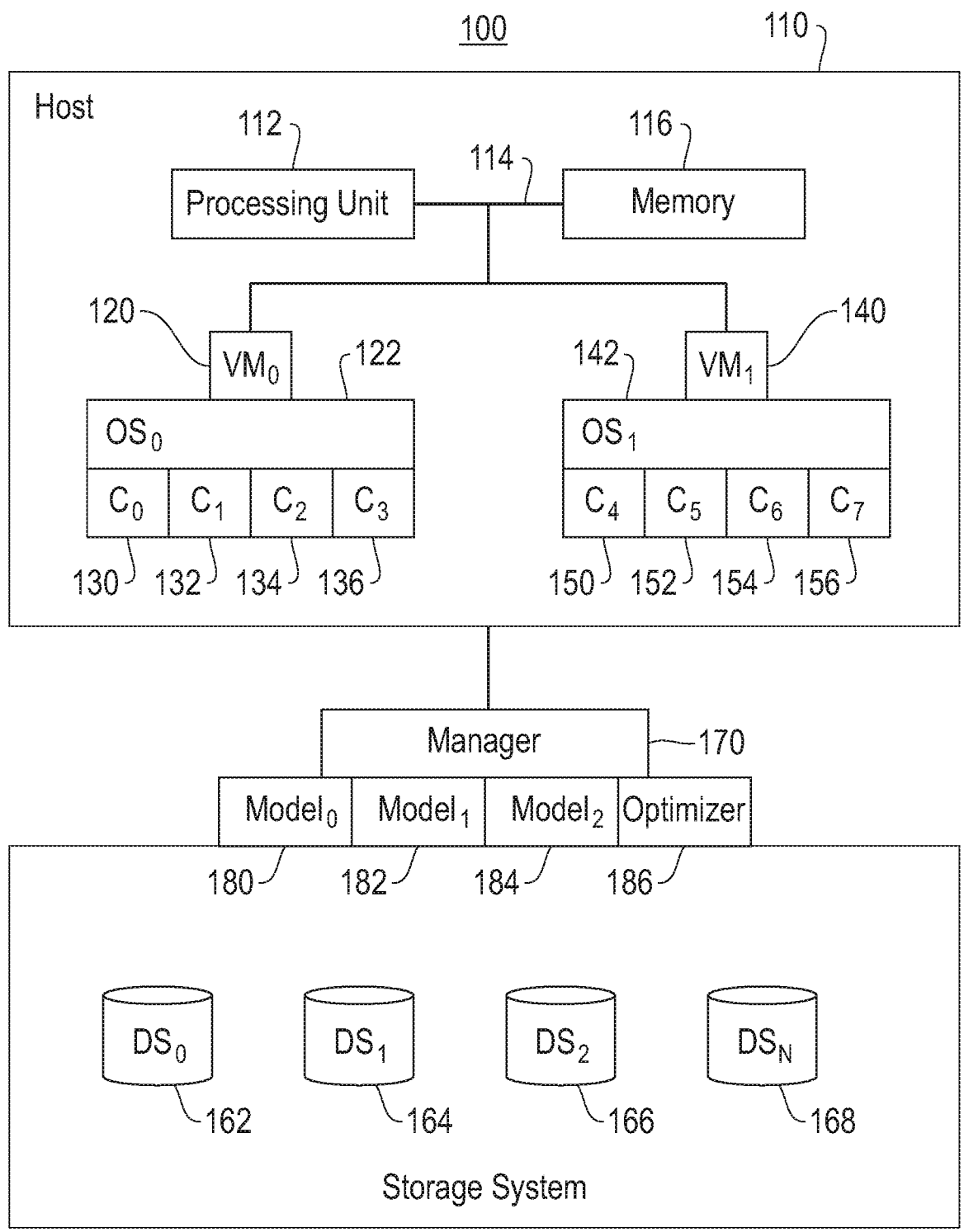
FIG. 1 depicts a block diagram illustrating a containerized eco-system operatively coupled to a shared storage system.

Referring to FIG. 1, a block diagram (100) is provided illustrating a containerized eco-system operatively coupled to a shared storage system. A host (110) is provided in the system and operatively coupled to a shared storage system (160). The host (110) is provided with a processing unit (112) operatively coupled to memory (116) across a bus (114). As shown herein, two virtual machines, $VM_0$ (120), and $VM_1$ (140) are supported by the memory (116) and processing unit (112). Although two virtual machines are shown, the quantity should not be considered limiting. Each of the virtual machines is a software embodiment that runs an operating system and one or more applications. More specifically, each virtual machine, (120) and (140), is comprised of a set of specification and configuration files and is backed by physical resources of the host (110). As shown, the first virtual machine, $VM_0$ (120) runs a first operating system, $OS_0$ (122), and the second virtual machine, $VM_1$ (140), runs a second operating system, $OS_1$ (142). Accordingly, the host (110) is shown herein with multiple VMs, with each VM running a separate OS or OS instance.

The operating systems, (122) and (142), respectively, are shared operating systems configured to support separate containerized applications, referred to as containers. Each container is an isolated application or isolated system supported by a shared operating system. As shown, $OS_0$ (122) is shown supporting four containers, including a first container, $C_0$ (130), a second container, $C_1$ (132), a third container, $C_2$ (134), and a fourth container, $C_3$ (136). Similarly, $OS_1$ (142) is shown supporting four containers, including a first container, $C_4$ (150), a second container, $C_5$ (152), a third container, $C_6$ (154), and a fourth container, $C_7$ (156). Although each of the shared operating systems (122) and (142) are shown supporting four containers, respectively, this is for illustrative purposes, and the quantity should not be considered limiting. Each container is isolated, and the respective shared operating system is hidden from the container.

The shared storage system (160) is shown operatively coupled to the host (110). More specifically, the shared storage system (160) is shown with a plurality of storage volumes, shown herein as $DS_0$ (162), $DS_1$ (164), $DS_2$ (166), and $DS_N$ (168). The quantity of storage volumes shown herein is for illustrative purposes and should not be considered limiting. The storage volumes are attachable and detachable storage elements with respect to the containers. As shown, a manager (170) is provided in communication with the storage system (170). The manager (170) supports instructions to selectively attaching and detaching a storage volume with respect to one or more of the containers. From the perspective of the storage system, management of storage volumes evolve with the functional requirements of the containers supported by the respective operating systems or operating system instances. With the containers, their configuration, and their operating system assignments shown herein, the manager (170) dynamically and selectively controls storage volume assignments to containers.

The selective assignment storage volume assignment is dynamic. More specifically, the manager responds to the functional characteristics of three aspects of the system including, the containers, the workflow, and the storage volumes. Characteristics of one or more of these three aspects are not static, and as they are subject to change, the manager responds to these changes so that the system functions as a healthy entity to support continued and functional workflow of the supported containers. To provide flexibility to the system, a storage volume assignment to a select container may be for a limited period of time. Similarly, this selective assignment may involve creation of a modified storage volume without full storage volume functionality, e.g. lightweight, with the manager (170) selecting a modified storage volume for assignment to a container with matching or closely matching functionality. Accordingly, the manager (170) functions to bridge the functionality of the storage volumes with the functional requirements of the containers.

Not all storage volumes need advanced functions or features at all times. For example, some containers may only need shared access to an associated storage volume during cluster health management operations. Similarly, some containers requirement for shared access to an associated storage volume are driven by application lifecycle driven events, which in one embodiment are not uniform across different stages of the lifecycle, e.g. different storage requirement at different lifecycle stage. The lifecycle of the application workflow is represented in the workflow model, and the manager (170) attaches and detaches select volume based on the stages of the lifecycle of their respective functional requirements. These are examples of how access to one or more storage volumes may be subject to change with respect to application lifecycle and application functions. It is understood that the shared storage volume access requirements may be explicitly defined or apparently known by an associated application. Accordingly, the manager (170) is configured to dynamically respond to and predict the storage volume requirements of the containers and their associated workflow(s).

As further shown, the manager (170) is configured with models to support the containerized applications and their respective and dynamic storage requirements. The models include a workflow model, $Model_0$ (180), a container topology model, $Model_1$ (182), and a storage topology model, $Model_1$ (184). The workflow model (180) is configured to track transition states of the containers and pertains to application states and their respective functional support requirements. The topology model (182) represents the landscape and arrangements of the containers, including relationship(s) and dependency between one or more application. For example, in one embodiment, two or more containers may be represented in a hierarchical arrangement, e.g. layered. The topology model (182) represents and identifies a relationship between two or more of the containers. The storage topology model (184) is configured to identify a relationship and dependency of storage volumes. Different storage volumes may have different functional characteristics. The volumes may be represented in a graph or a hierarchy, e.g. layers, with the representation reflected in the storage topology model (184). In addition to the models (180)-(184), the manager (170) is configured with an optimizer (186) to determine an optimal mapping of containers to a storage system construct, such as a volume or a modified volume, based on container context awareness and storage system resource models. With support of the models (180)-(184) and the optimizer (186), the manager (170) selectively assigns or modifies an assignment of the containers with respect to one or more storage volumes (162)-(168), and selectively attaches/detaches the containers, balances or re-balances storage volumes, and responds to workflow status updates and changes.

Figure 2:
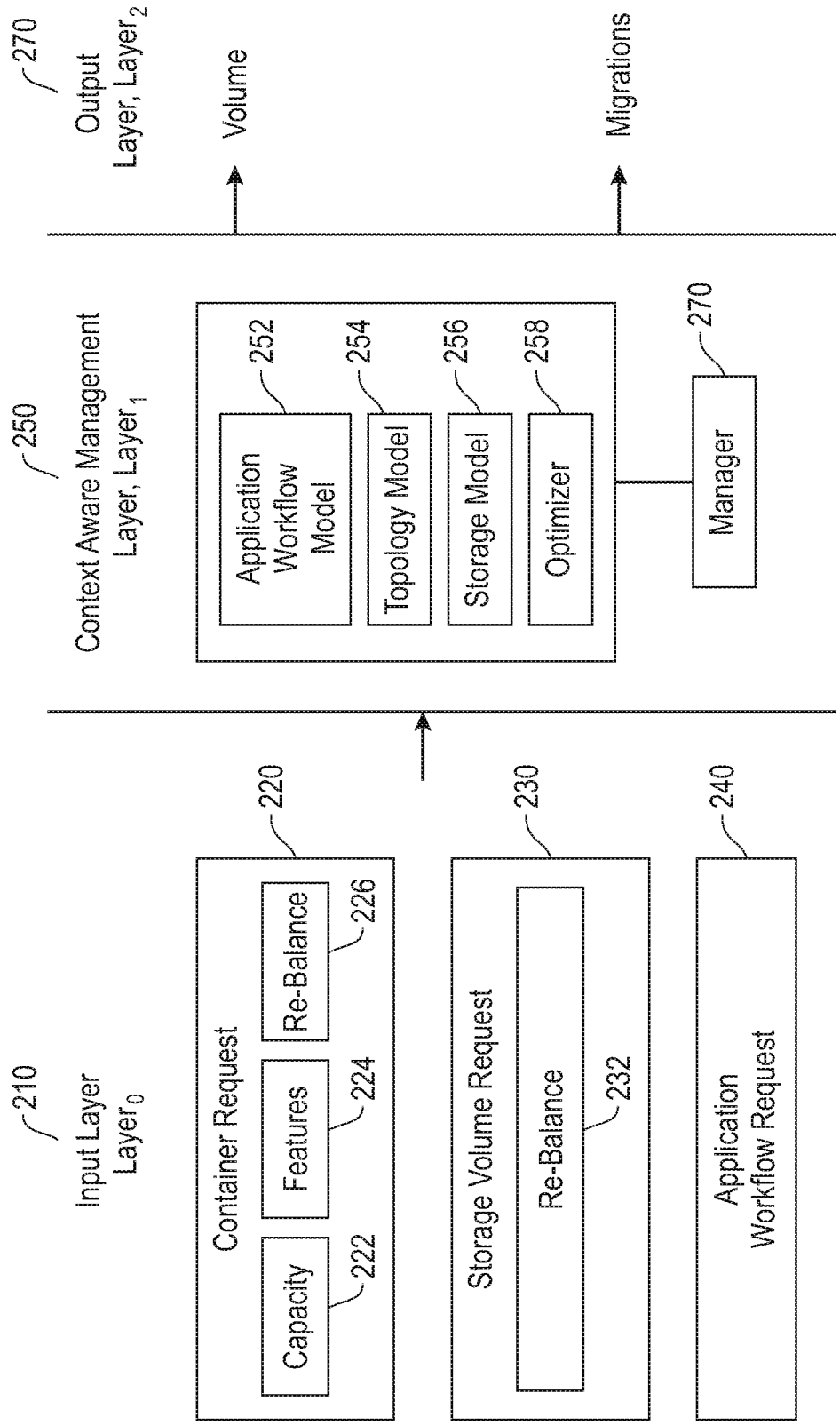
FIG. 2 depicts a block diagram illustrating context aware volume management for containers.

Referring to FIG. 2, a block diagram (200) is provided to illustrate context aware volume management for containers. There are three distinct layers shown and described, including input, $layer_0$ (210), context aware management, $layer_1$ (250), and output, $layer_2$ (270). Communication from the first later, $layer_0$ (210), to the context aware management, $layer_1$ (250), may come in various forms, shown as originating with one or more of the containers (220), originating with one or more storage volumes (230), and/or originating with application workflow (240). The origination with one or more containers (220) includes the context aware management, $layer_1$ (250), receiving a request from a container (220), with the request including capacity requirements (222) and features (224) of one or more requested storage volumes to support the functional needs of the requesting container. The origination with one or more storage volumes (230) includes the context aware management, $layer_1$ (250), receiving a request to rebalance (232) and/or update one or more of the containers. The origination with the application workflow at (240) is directed at predicted or known changes in the workflow and any changes to be reflected in their support. Another form of input is shown as a re-balancing update (226). Receipt of input from $layer_0$ (210) is received by the context aware management, $layer_1$ (250). As shown, $layer_1$ (250) includes the application workflow model (252), the topology model (254), the storage model (256), and the optimizer (258). Output from $layer_1$ (250) is communicated and implemented at $layer_2$ (270).

The manager (290) is shown herein operatively coupled to $layer_1$ (250). In one embodiment, the manager (290) is part of the storage system or is operatively coupled to the storage system. The manager (290) may be centrally positioned, or de-centralized. The manager (290) may be a multi-state component. More specifically, the manager (290) may be in an inactivate state, such as a sleep or hibernate state, and receipt of input from $layer_0$ (210) changes the state of the manager (290) to an active state. The manager (290) receives instructions from the optimizer (258), which leverages one or more of the models (252), (254), and (256), to communicate output to $layer_2$ (270).

As shown and described in FIGS. 1 and 2, the application workflow models tracks a set of states and transitions of applications. Different application states have different functional and storage volume requirements. The workflow model provides data directed at current application states, and in one embodiment future application state to analyze and predict functional and storage volume requirements. The topology model represents the landscape arrangement of the containerized applications, including relationship(s) and dependency between one or more containerized application. The storage model represents relationships and dependency between one or more storage volumes. The optimizer bridges the models and determines an optimal mapping of containers to a storage system construct, such as a volume or a modified volume, based on container context awareness and storage system resource models.

Figure 3:
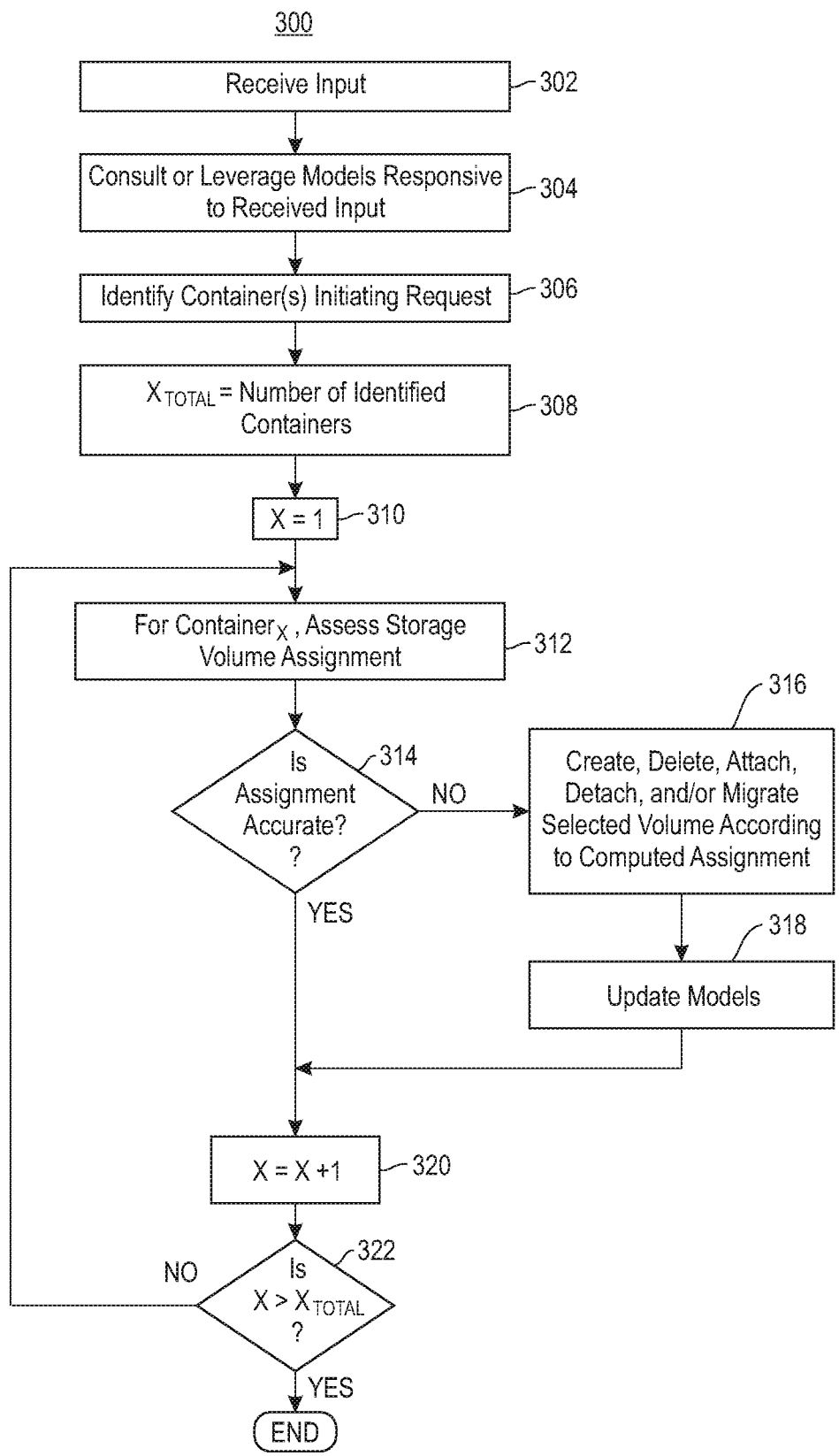
FIG. 3 depicts a flow chart illustrating a storage volume assignment optimization.

The manager shown in FIG. 1 as (170) and FIG. 2 as (290) functions to support container volume requests. Examples of these request initiated by one or more of the containerized applications include, but are not limited to, a request for storage volume creation or deletion, a request for storage volume attachment or detachment, and a requested update to a storage volume, i.e. a change in requirements. Referring to FIG. 3, a flow chart (300) is provided to illustrate a storage volume assignment optimization. Input in some form is received (302). Examples of input from the first layer (210) are shown and described in FIG. 2. The models, including the application workflow model, the topology model, and the storage model are consulted or leveraged responsive to the input (304). It is understood that there is inter-dependency among the models. The container(s) that initiated the request are identified (306), the variable $X_{Total}$ is assigned to the quantity of identified containers (308), and a corresponding counting variable is initialized (310). For each container$_X$, an assessment of the storage volume assignment is conducted (312) by leveraging the models (180)-(184), shown and described in FIG. 1, and it is determined if the assignment is accurate (314). The assessment is multi-dimensional and incorporates aspects of workflow, container topology, and storage topology. A positive response to the determination at step (314) concludes the assignment evaluation and optimization. However, a negative response to the determination at step (314) is followed by creating, deleting, attaching, detaching, and/or migrating select volume according to a computed assignment (316). In addition, following any changes conducted at step (316), the application workflow model, the topology model, and the storage model are selectively updated to reflect the changes (318).

Following a negative response to the determination at step (314) or following step (318), the identified container counting variable, X, is incremented (320), and it is determined if each of the identified containers has been assessed (322). A negative response is followed by a return to step (312), and a positive response concludes the container assessment. Accordingly, the storage volume assignment and associated evaluation may be conducted as a response to a volume request.

Figure 4:
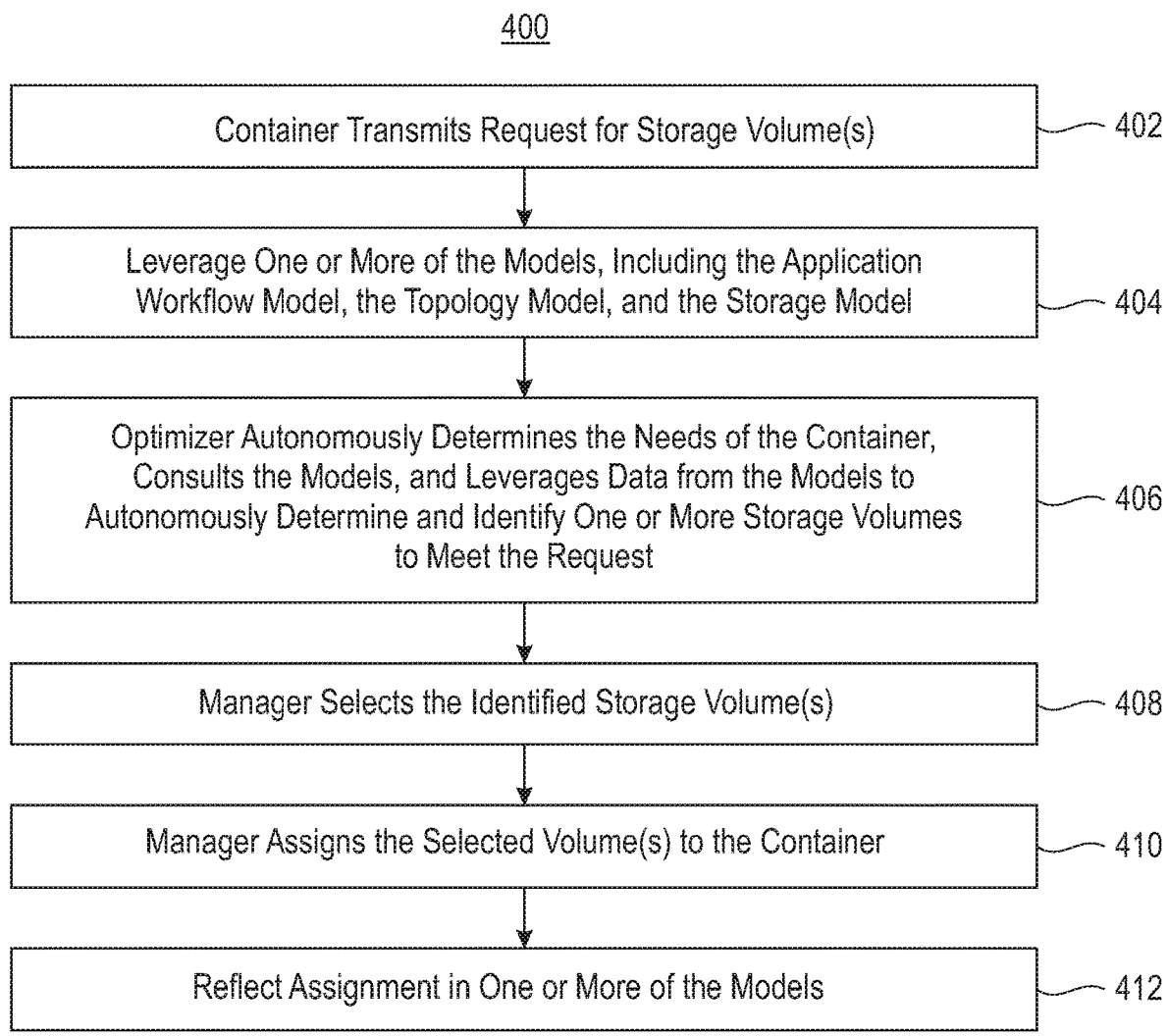
FIG. 4 depicts a flow chart illustrating selective assignment of one or more storage volumes responsive to a request from one or more containers.

Referring to FIG. 4, a flow chart (400) is provided to illustrate selective assignment of one or more storage volumes responsive to a request from one or more containers. As shown, a container transmits a request for one or more storage volume(s) (402). The request may be expressly indicated, or in one embodiment inherently indicated based on the behavior and associated behavioral characteristics of the containerized application. Similarly, the request at step (402) may identify a specific volume or a volume characteristic in the request. Upon an express or inherent request from step (402), one or more of the models, including the application workflow model, the topology model, and the storage model are leveraged (404). The optimizer autonomously determines the needs of the container, consults the models (180)-(184), and leverages data from the models to autonomously determine and identify one or more storage volumes to meet the request (406). As described herein, the storage volume identification and assignment utilizes a multi-dimensional evaluation of the container, including workflow, container topology, and storage topology. The manager selects the identified storage volume(s) (408), and assigns the selected volume(s) to the container (410). The assignment at step (410) is reflected in one or more of the models (412). More specifically, the manager updates the models to reflect the assignment so that the models have a current reflection of the state of the workflow, container topology, and storage assignments and topology. Accordingly, as demonstrated herein, the models are leveraged and the optimizer together with the manager identifies, selects, and assigns one or more storage volumes to satisfy a request associated with a container.

The manager (170) makes autonomous decisions and functions as an interface between the container and the storage layer, e.g. storage volumes. The optimizer addresses the needs of the container(s) with respect to storage volume assignment. In one embodiment, the storage volume assignment may be less than what the containerized application(s) have requested, but enough to support the functional requirements.

Figure 5:
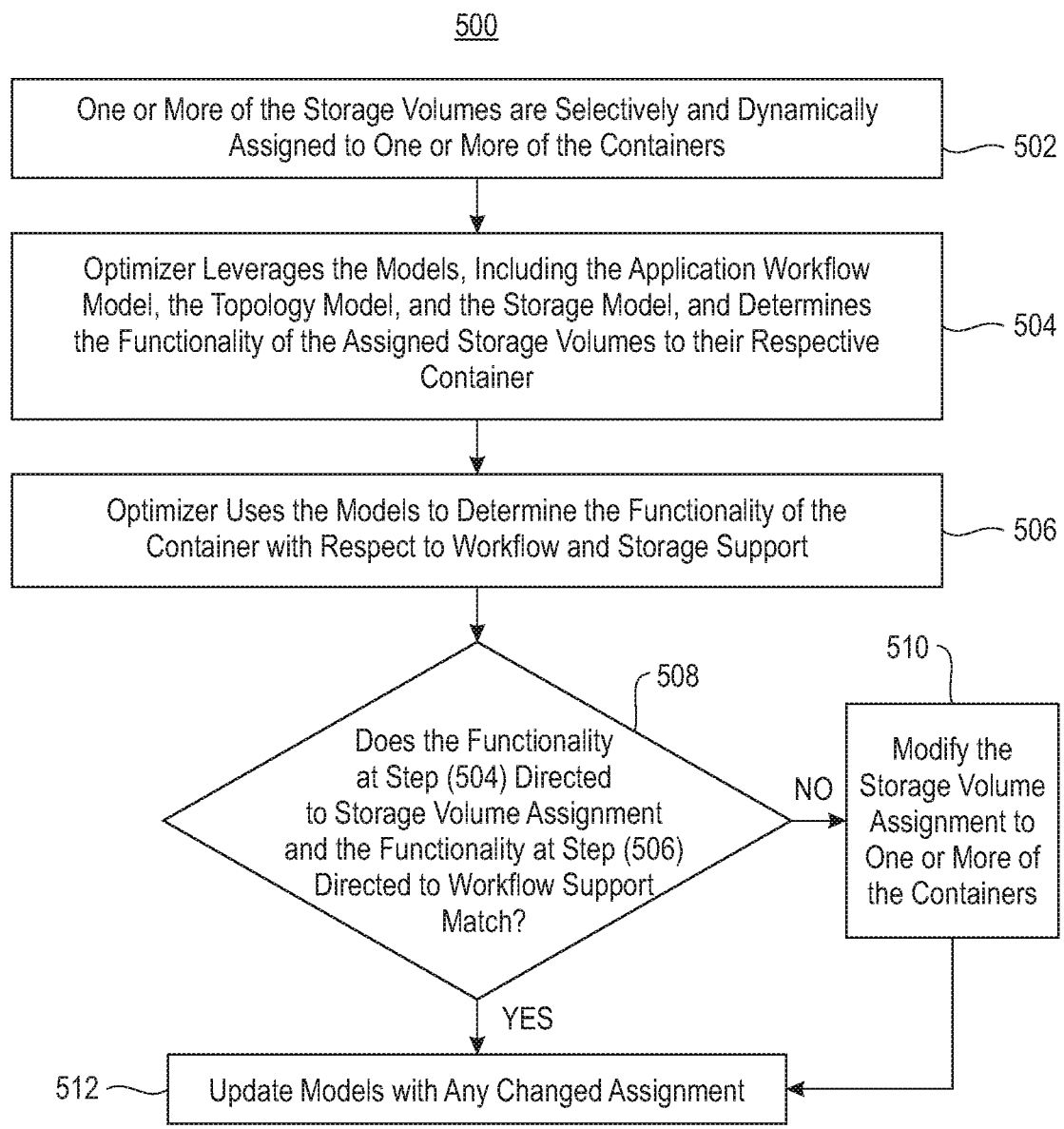
FIG. 5 depicts a flow chart illustrating manager oversite of assignments of storage volumes to containers.

Referring to FIG. 5, a flow chart (500) is provided to illustrate manager oversite of assignments of storage volumes to containers. In the system shown and described in FIGS. 1 and 2, there are multiple containers interfacing with storage volumes via the manager (170). One or more of the storage volumes are selectively and dynamically assigned to one or more of the containers (502). The optimizer leverages the models, including the application workflow model, the topology model, and the storage model to determine the functionality of the assigned storage volumes to their respective container (504). In addition, the optimizer uses the models to determine the functionality of the container with respect to workflow and storage support (506). An assessment is conducted to determine if the functionality at step (504) directed to storage volume assignment and the functionality at step (506) directed to workflow support match (508). More specifically, it is determined if the storage volume assignment correlates with the requirements of the container(s). In one embodiment, the assignment may be an inefficient use of the storage volumes. Similarly, in one embodiment, the assignment may not be supporting the containers, which may prevent the container from conducting their functional requirements. A negative response to the determination at step (508) is followed by modifying the storage volume assignment to one or more of the containers (510). Following the assignment at step (510) or a positive response to the determination at step (508), the models are updated with any changed assignments (512). Accordingly, as shown herein, an evaluation of the storage volume assignment is conducted, with changes reflected in an update of one or more of the corresponding models.

Figure 6:
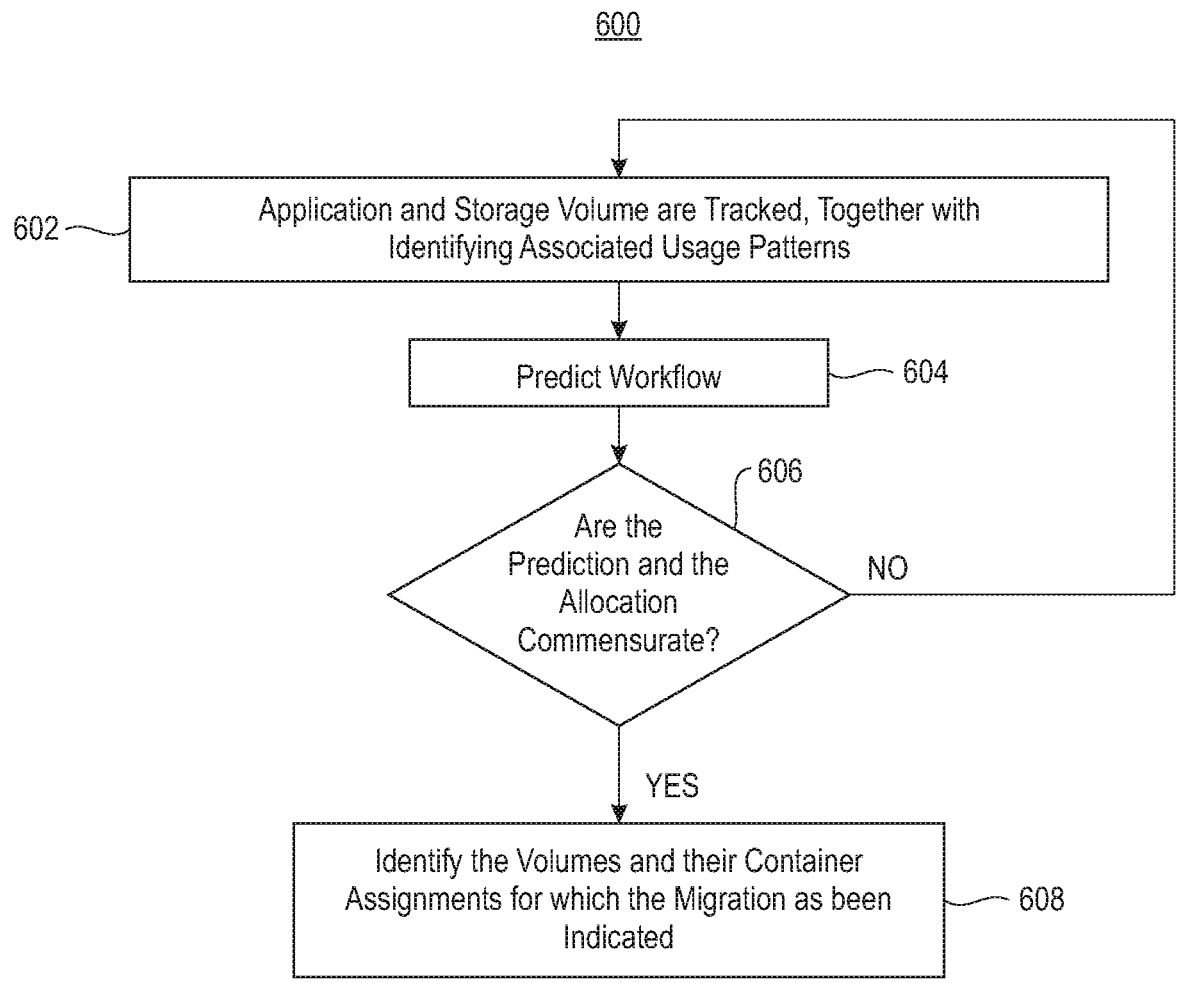
FIG. 6 depicts a flow chart illustrating selective assignment of one or more storage volumes responsive to workflow.

Referring to FIG. 6, a flow chart (600) is provided to illustrate selective assignment of one or more storage volumes responsive to workflow. It is understood that some workflow characteristics are predictable, and some are not predictable. For example, a service level agreement (SLA), which is a contract between a service provider and an internal or external customer defines service standards and obligations of the service providers. SLAs may include specific performance benchmarks directed at storage and workflow. Some SLAs may have different performance benchmark requirements during different hours of the day, and different days of the week. These performance benchmarks may be employed to predict resource availability and reflected in the associated models, including the application workflow model, the topology model, and the storage model. As shown herein, application and storage volume are tracked, together with identifying associated usage patterns (602). In one embodiment, at step (602) a corresponding SLA is leveraged to identify any patterns. Following step (602), the identified patterns are utilized, or in one embodiment the SLA, and storage volume assignments with respect to workflow are predicted (604). It is understood that the prediction at step (604) provides insight into the allocation of storage volumes, and more specifically, if the allocation is proper or in one embodiment, if the allocation is efficient. Following step (604), it is determined if the prediction and the allocation are commensurate (606), e.g. if a storage volume migration is indicated. A negative response to the determination at step (606) is followed by a return to step (602) for continued tracking of patterns. However, a positive response to the determination at step (606) is following by identifying the volumes and their container assignments for which the migration has been indicated (608). Accordingly, the initial evaluated aspect is directed at behavioral characteristics of workflow and containerized applications.

A storage array is a hardware element that contains a plurality of storage devices. The array is commonly configured with a storage controller to manage the storage devices within the array. Applications are known to store their data as files. The storage array can be one dimensional with a single category of storage devices, or in one embodiment multi-dimensional, also referred to herein as a tiered storage solution with multiple types of storage, e.g. persistent RAM, SSD, HDD, and Tape. More specifically, tiered storage directs data to a storage media within the storage array based on performance, availability, and recovery requirements.

Figure 7:
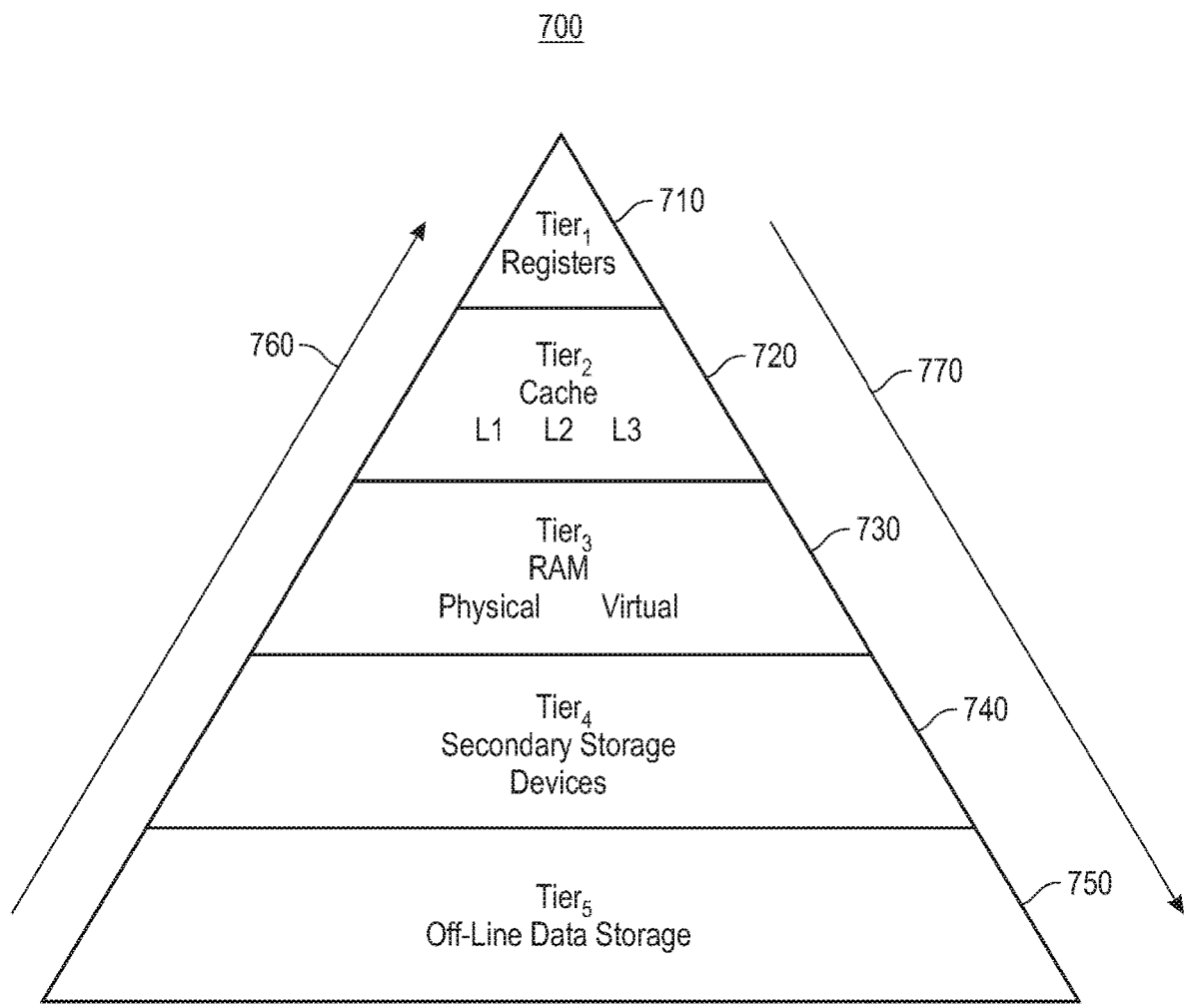
FIG. 7 depicts a block diagram illustrating a hierarchical structure of a storage system.

Referring to FIG. 7, a block diagram (700) is provided illustrating a hierarchical structure of a storage system. As shown in this example, there are five tiers (710), (720), (730), (740), and (750). $Tier_1$ (710) represents processor registers. $Tier_2$ (720) represents cache, including L1, L2, and L3. $Tier_3$ (730) represents main memory RAM, including physical RAM and virtual memory. $Tier_4$ (740) represents secondary storage devices, such as a hard disk drive (HDD) and removable storage. $Tier_5$ (750) represents off-line data storage. In the example shown herein, only five tiers are described in detail. The embodiments should not be limited to the quantity of tiers shown and described. In one embodiment, the hierarchical structure may include a fewer or greater quantity of tiers, with each tier representing a class of storage components. Speed with respect to accessing data is the fastest on $Tier_1$ (710), and continues to steadily decrease from $Tier_2$ (720) to $Tier_5$ (750). With respect to cost, $Tier_5$ (750) is the least expensive, with the costs increasing at a relatively steady rate from $Tier_5$ (750) to $Tier_1$ (710). A faster access time is obtained by moving up the hierarchy, as represented by (760), while larger storage capacity and lower costs are obtained by moving down the hierarchy, as represented by (770). Processor storage components, shown in $Tier_1$ (710), generally have the fastest access times, the smallest storage capacity, and the highest cost. Accordingly, as represented, different groups of storage devices all store data differently with the amount of data that they can store being different and how fast they store the data also being different. Furthermore, different tiers can perform better or worse depending on the application access pattern. For example, HDD-based tiers perform exceptionally well for large sequential writes and SSD-based tiers are most suitable for small random reads.

Storage types are organized into the hierarchy shown with each container designated to a tier based on associated storage device characteristics, such as expense, performance, and reliability. In one embodiment, the storage hierarchy distinguishes each tier in the hierarchy by response time. For example, small objects with synchronous access, e.g. metadata, can be placed in low-latency storage, and objects with frequent overwrites can be placed in cache. Data that is the subject of a write request is placed in data storage, and selection of an appropriate storage tier is relatively complex. For example, data that is shared may be accessed from multiple processing nodes and, as such, placement needs to consider both local and remote accesses and associated costs. Similarly, compressibility characteristics need to be considered for data objects that are likely to be subject to compression. With respect to compressibility, text and image data may be subject to different compression rates. A file with a higher compressibility may be stored in a storage layer that supports compression. Similarly, with respect to de-duplication, it is understood that objects that have a high probability to de-duplicate against each other can be stored together in a content-addressable storage (CAS) layer. In addition, separate optimizations may take place during both the read and write requests to enhance performance or provide new functionalities. For example, write requests can effectively index logical data objects to speed up future user searches and read requests automatically audit logical object accesses. Accordingly, the storage topology model represents the hierarchical arrangement of storage devices based on storage types and associated device characteristics.

Figure 8:
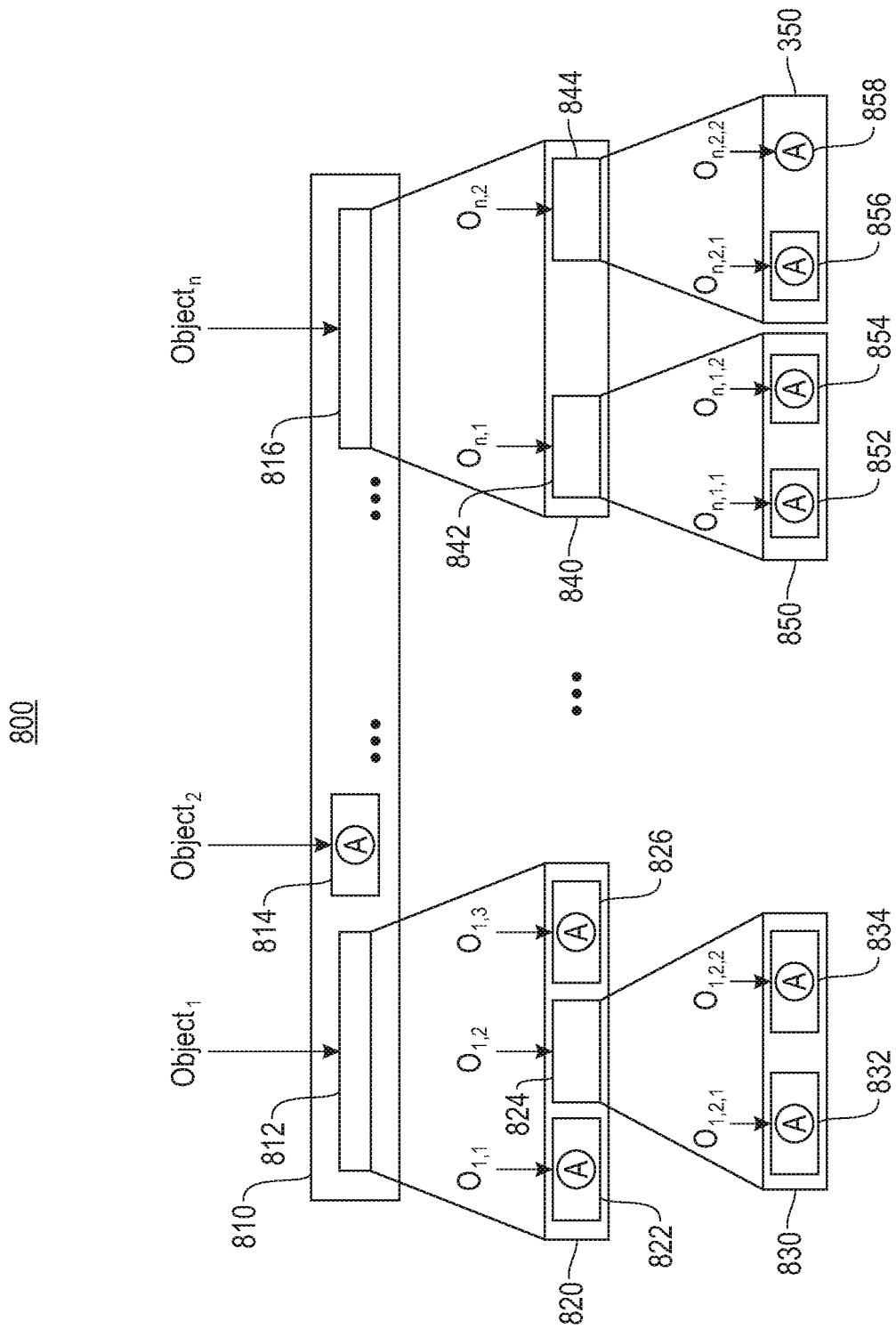
FIG. 8 depicts a block diagram illustrating a hierarchical representation of layered containers.

Referring to FIG. 8, a block diagram (800) is provided illustrating a hierarchical representation of layered containers. As shown, a container (810) is composed of multiple containers, referred to herein as objects, including $object_1$ (812), $object_2$ (814), and $object_N$ (816). Each object may be a layered container. As described above, a layered container is a container that is dependent on container (810) or has a dependency relationship to container (810). A first tier (820) shows a further de-composition of layered $object_1$ (812) with multiple containers, e.g. objects, including $object_{1,1}$ (822), $object_{1,2}$ (824), and $object_{1,3}$ (826). A second tier (830) shows a further de-composition of layered containers, e.g. objects, shown herein as $object_{1,2}$ (824), composed of $object_{1,2,1}$ (832) and $object_{1,2,2}$ (834). Similarly, $object_N$ (816) is shown as a layered container, with the first tier (840) showing a de-composition into two objects, $object_{N,1}$ (842) and $object_{N,2}$ (844), both which are shown as layered containers, e.g. objects. A second tier (850) demonstrates further de-composition of the layered containers of the first tier (840). As shown, $object_{N,1}$ (842) is composed of $object_{N,1,1}$ (852) and $object_{N,1,2}$ (854), and $object_{N,2}$ (844) is composed of $object_{N,2,1}$ (856) and $object_{N,2,2}$ (858). Accordingly, as shown herein the containers may be arranged in a hierarchy with layering and dependencies.

Aspects of the optimizer, models, and manager, and their associated functionality may be embodied in a computer system/server in a single location, or in one embodiment, may be configured in a cloud based system sharing computing resources. With references to FIG. 9, a block diagram (900) is provided illustrating an example of a computer system/server (902), hereinafter referred to as a host (902) of a cloud based support system, to implement the processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments where tasks are performed by remote processing devices that are linked through a communications network. In a distributed cloud computing environment, program modules may be located in both local and remote computer system storage media including memory storage devices.

Figure 9:
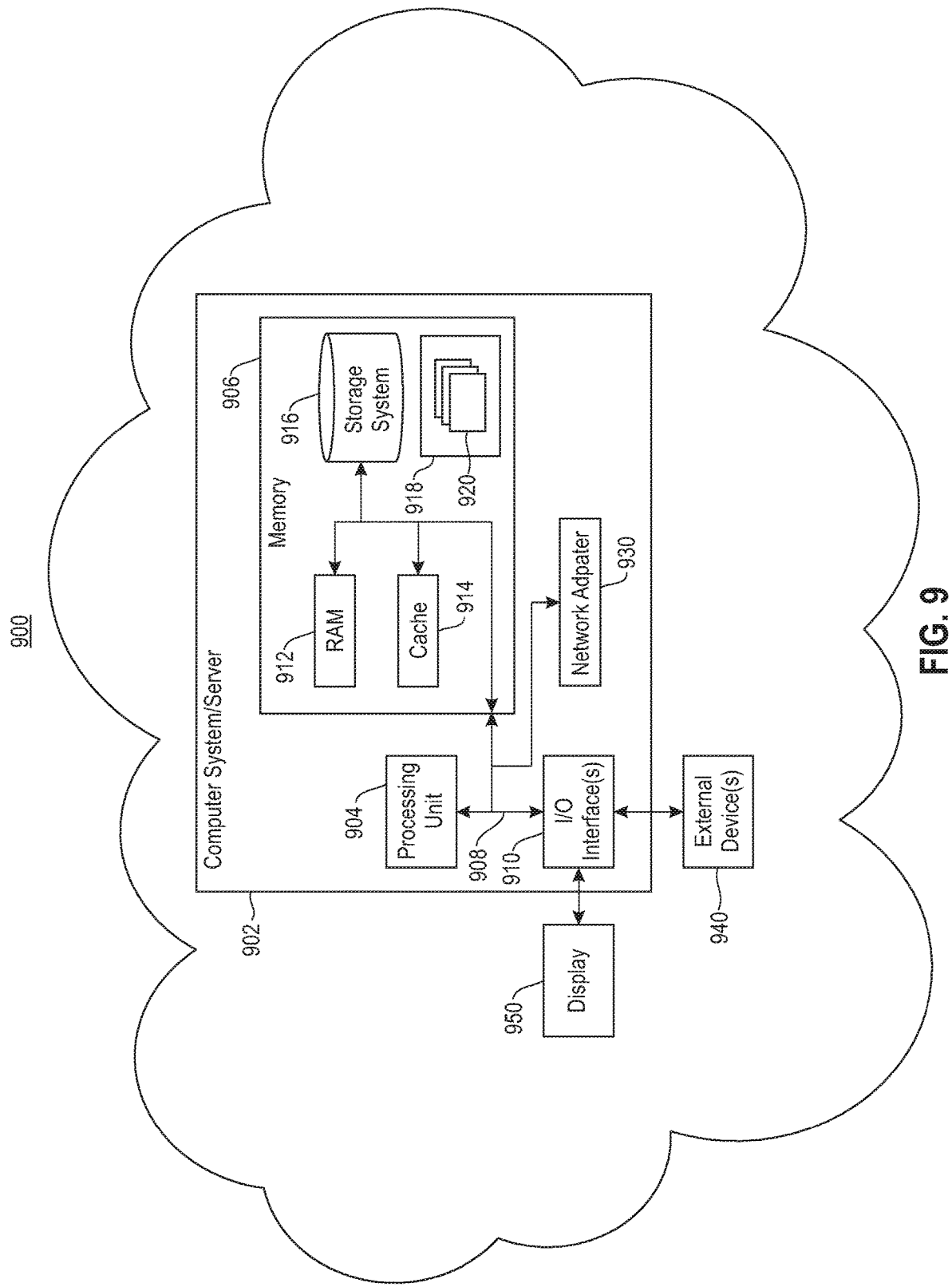
FIG. 9 depicts a schematic example of a system to implement the process shown and described in FIGS. 3-8.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (912) and/or cache memory (914). By way of example only, storage system (916) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (918), having a set (at least one) of program modules (920), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (920) generally carry out the functions and/or methodologies of embodiments of file decomposition and associated reassembly as described herein. For example, the set of program modules (920) may include the modules configured to implement the context aware volume management for containers described above with reference to FIGS. 1-8.

Host (902) may also communicate with one or more external devices (940), such as a keyboard, a pointing device, etc.; a display (950); one or more devices that enable a user to interact with host (902); and/or any devices (e.g., network card, modem, etc.) that enable host (902) to communicate with one or more other computing devices. Such communication can occur via Input/Output (I/O) interface(s) (910). Still yet, host (902) can communicate with one or more networks such as a local area network (LAN), a general wide area network (WAN), and/or a public network (e.g., the Internet) via network adapter (930). As depicted, network adapter (930) communicates with the other components of host (902) via bus (908). In one embodiment, a plurality of nodes of a distributed file system (not shown) is in communication with the host (902) via the I/O interface (910) or via the network adapter (930). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (912), cache (914), and storage system (916), such as a removable storage drive and a hard disk installed in a hard disk drive.

Computer programs (also called computer control logic) are stored in memory (906). Computer programs may also be received via a communication interface, such as network adapter (930). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
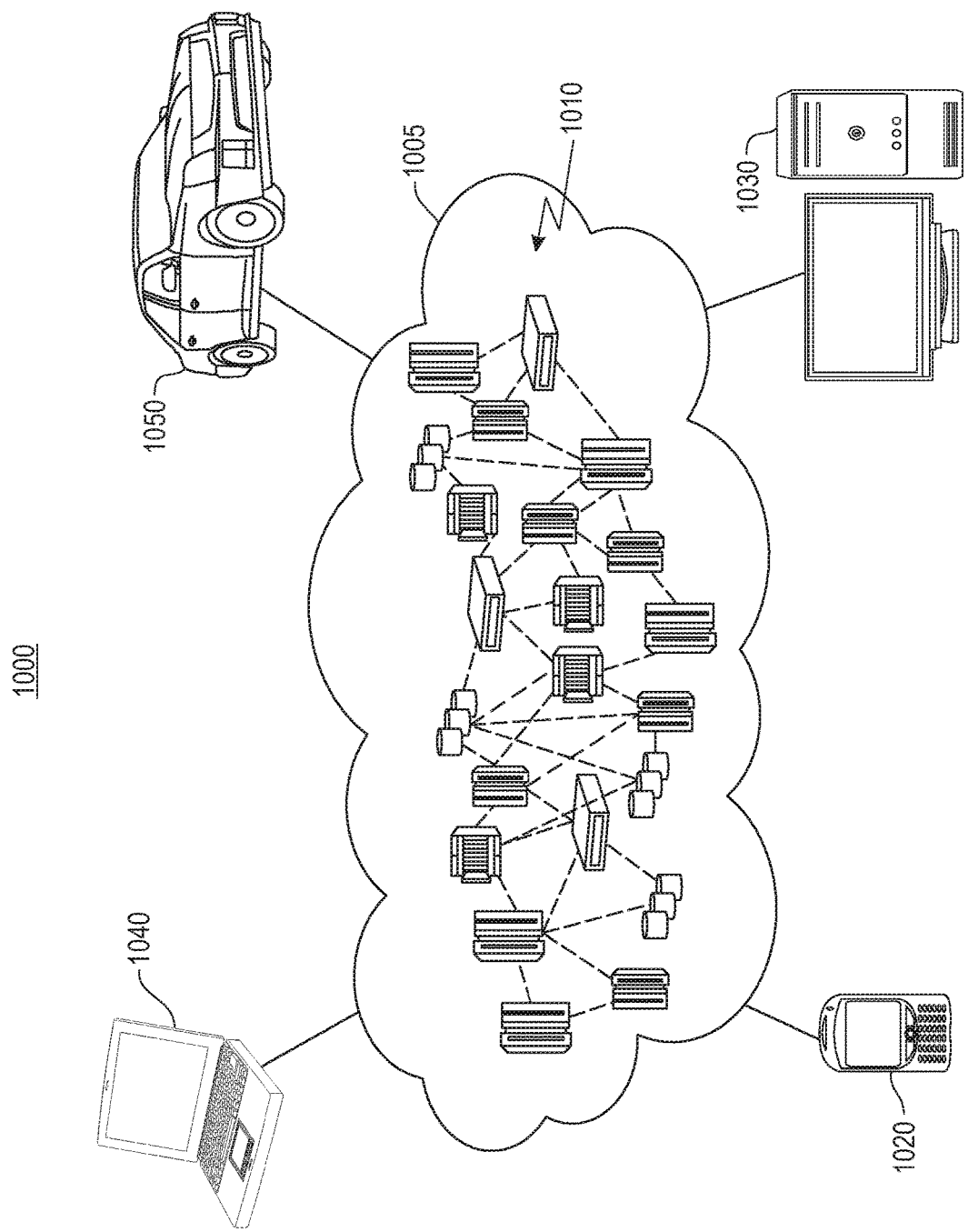
FIG. 10 depicts a block diagram illustrating a cloud computing environment.

Referring now to FIG. 10, an illustrative cloud computing network (1000). As shown, cloud computing network (1000) includes a cloud computing environment (1005) having one or more cloud computing nodes (1010) with which local computing devices used by cloud consumers may communicate. Examples of these local computing devices include, but are not limited to, personal digital assistant (PDA) or cellular telephone (1020), desktop computer (1030), laptop computer (1040), and/or automobile computer system (1050). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1020)-(1050) shown in FIG. 10 are intended to be illustrative only and that the cloud computing environment (1005) can communicate with any type of computerized device over any type of network and/or network addressable connection (e.g., using a web browser).

Figure 11:
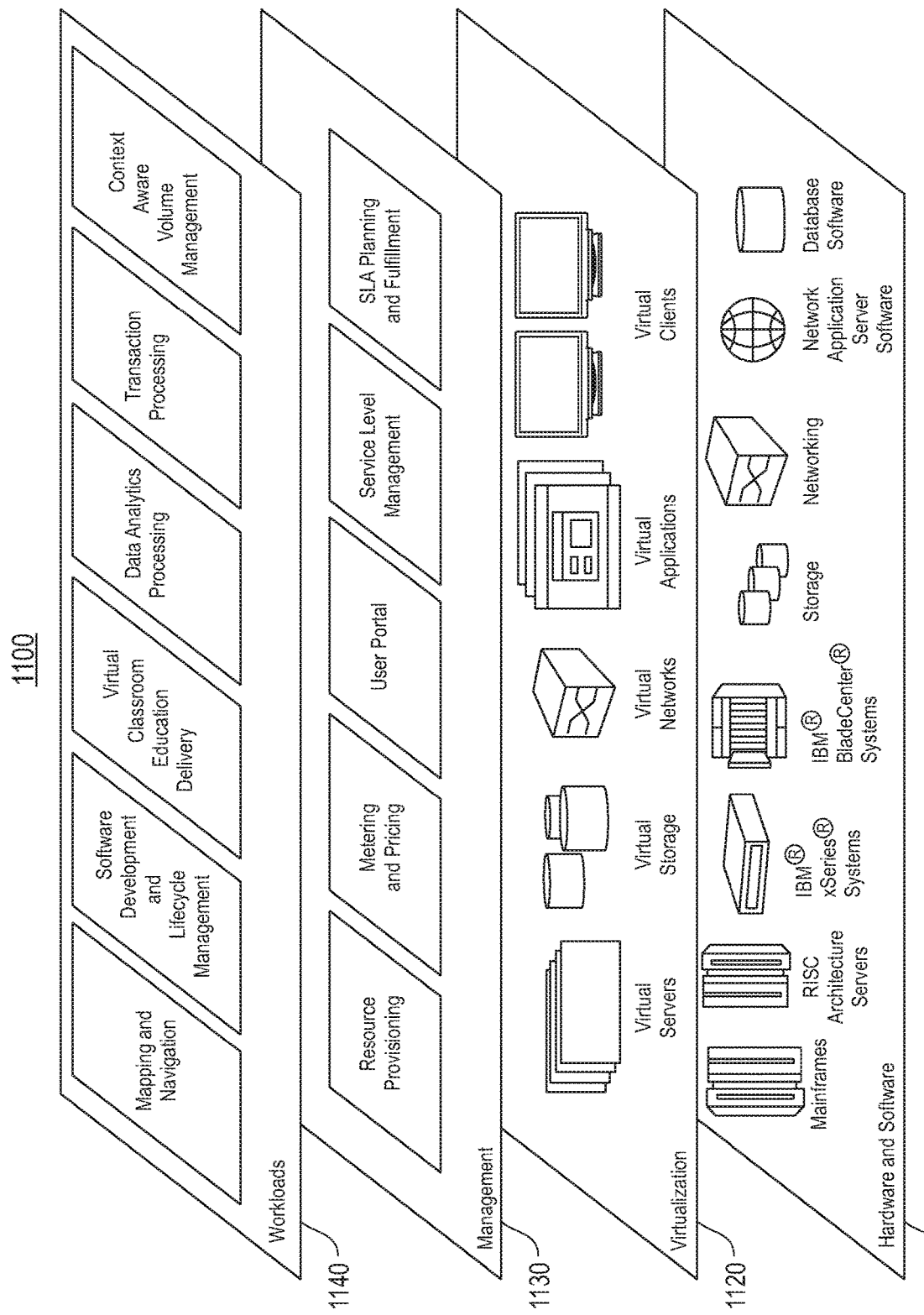
FIG. 11 depicts a block diagram illustrating a set of functional abstraction model layers provided by the cloud computing environment.

Referring now to FIG. 11, a set of functional abstraction layers provided by the cloud computing network of FIG. 9 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and context aware volume management for containers within the cloud computing environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments with various modifications as are suited to the particular use contemplated. Accordingly, the context aware volume management recognizes dynamic characteristics of workflow, container topology, and storage topology and efficiently utilizes the characteristics to selectively and dynamically assign storage volumes to containers.

It will be appreciated that, although specific embodiments have been described herein for purposes of illustration, various modifications may be made without departing from the spirit and scope of the embodiments. Accordingly, the scope of protection of these embodiments is limited only by the following claims and their equivalents.

What is claimed is:

1. A computer system comprising:
   a processor operatively coupled to memory;
   an operating system (O/S) operatively coupled to the processor, the O/S shared with two or more application containers, the two or more application containers managed by the shared O/S, and a manager to manage selective assignment of the application containers to one or more storage volumes;
   the manager to leverage data from one or more models to autonomously determine container requirements for the two or more application containers, the models including:
      a workflow model corresponding to the two or more application containers, including the workflow model to track one or more transition states for each of the application containers;
      an application container topology model to identify a relationship between the two or more containers, including any container dependencies; and
      a storage topology model to identify a relationship and dependency of the one or more storage volumes; and
   responsive to the one or more models and the determination, an optimizer to optimize assignment of at least one of the two or more application containers to the one or more storage volumes, and the manager to selectively attach the at least one of the two or more application containers to the one or more storage volumes responsive to the optimized assignment.

2. The system of claim 1, further comprising dynamic migration of the one or more storage volumes based on predicted needs of the at least one of the two or more application containers, including the manager to selectively attach the one or more storage volumes to the at least one of the two or more application containers based on the prediction.

3. The system of claim 2, wherein the workflow model predicts a future storage requirement, and wherein the selective attachment of the one or more storage volumes to the at least one of the two or more application containers includes the manager to attach or detach the one or more storage volumes based on a prediction from the workflow model.

4. The system of claim 1, wherein the optimizer assignment of the at least one of the two or more application containers to the one or more storage volumes further comprises the optimizer to match functionality of the one or more storage volumes to a functional requirement of the at least one of the two or more application containers.

5. The system of claim 4, further comprising a modified storage container with limited functionality of the one or more storage volumes, and wherein functionality match includes the optimizer to reconcile the modified storage container with the functional requirement of the at least one of the two or more application containers.

6. The system of claim 1, further comprising the optimizer to detect a change in a characteristic represented in the storage topology model, wherein the detected change is selected from the group consisting of: the of one or more of the storage volumes and a topological change in the modeling, and re-optimizing the container assignment responsive to the detected change.

7. A computer program product to support context aware volume management, the computer program product comprising a computer readable storage device having program code embodied therewith, the program code executable by a processing unit to:
model workflow corresponding to two or more application containers, including track one or more transition states for each of the application containers;
model application container topology, including identify a relationship between the two or more containers, including any container dependencies; and
model storage topology, including identify a relationship and dependency of one or more storage volumes;
leverage data from the one or more models to autonomously determine container requirements for the two or more application containers; and
responsive to the one or models and the determination, optimize assignment of at least one of the two or more application containers to a storage volume, and selectively attach the at least one of the two or more application containers to the one or more storage volumes responsive to the optimized assignment.

8. The computer program product of claim 7, further comprising program code to dynamically migrate the one or more storage volumes based on predicted needs of the at least one of the two or more application containers, including selectively attach the one or more storage volumes to the at least one of the two or more application containers based on the prediction.

9. The computer program product of claim 8, wherein the workflow model predicts a future storage requirement, and wherein the selective attachment of the one or more storage volumes to the at least one of the two or more application containers includes program code to attach or detach the one or more storage volumes based on a prediction from the workflow model.

10. The computer program product of claim 8, wherein the program code to optimize assignment of the at least one of the two or more application containers to the one or more storage volumes further comprises program code to match functionality of the one or more storage volumes to a functional requirement of the at least one of the two or more application containers.

11. The computer program product of claim 10, further comprising program code to create a modified storage container with limited functionality of the one or more storage volumes, and wherein matching functionality includes program code to reconcile the modified storage container with the functional requirement of the at least one of the two or more application containers.

12. The computer program product of claim 7, further comprising the storage topology model to detect a change in a characteristic represented in the model, wherein the detected change is selected from the group consisting of: the of one or more ef the storage volumes and a topological change in the model, and further comprising program code to re-optimize the container assignment responsive to the detected change.

13. A method comprising:
in a computer system configured with two or more application containers managed by a shared operating system (O/S), managing selective assignment of the application containers to one or more storage volumes, including:
modeling workflow corresponding to the two or more application containers, including tracking one or more transition states for each of the application containers;
modeling application container topology, including identifying a relationship between the two or more containers, including any container dependencies; and
modeling storage topology, including identifying a relationship and dependency of the one or more storage volumes;
leveraging data from the modeling to autonomously determine container requirements for the two or more application containers; and
responsive to the modeling and the determination, optimizing assignment of at least one of the two or more application containers to a storage volume, and selectively attaching the at least one of the two or more application containers to the one or more storage volumes responsive to the optimized assignment.

14. The method of claim 13, further comprising dynamically migrating the one or more storage volumes based on predicted needs of the at least one of the two or more application containers, including selectively attaching the one or more storage volumes to the at least one of the two or more application containers based on the prediction.

15. The method of claim 14, wherein modeling workflow includes predicting a future storage requirement, and wherein the selective attachment of the one or more storage volumes to the at least one of the two or more application containers includes attaching or detaching the one or more storage volumes based on a prediction from the workflow modeling.

16. The method of claim 13, wherein optimizing assignment of the at least one of the two or more application containers to the one or more storage volumes further comprising matching functionality of the one or more storage volumes to a functional requirement of the at least one of the two or more application containers.

17. The method of claim 16, further comprising creating a modified storage container with limited functionality of the one or more storage volumes, and wherein matching functionality includes reconciling the modified storage container with the functional requirement of the at least one of the two or more application containers.

18. The method of claim 13, further comprising the storage topology modeling detecting a change in a characteristic represented in the modeling, wherein the detected change is selected from the group consisting of: the one or more storage volumes and a topological change in the modeling, and re-optimizing the container assignment responsive to the detected change.

\* \* \* \* \*